United States Patent
Thommana et al.

(10) Patent No.: US 11,831,469 B2
(45) Date of Patent: Nov. 28, 2023

(54) HETEROGENOUS NETWORK OF TACTICAL NETWORK AND MOBILE CORE NETWORK VIA MILITARY TRUSTED INTERWORKING FUNCTION (M-TIF) DEVICE

(71) Applicant: Rockwell Collins, Inc., Cedar Rapids, IA (US)

(72) Inventors: John V. Thommana, Cedar Rapids, IA (US); Naveen Rajanikantha, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 190 days.

(21) Appl. No.: 17/443,518

(22) Filed: Jul. 27, 2021

(65) Prior Publication Data

US 2023/0147822 A1   May 11, 2023

(51) Int. Cl.
*H04L 12/66* (2006.01)
*H04W 12/08* (2021.01)
*H04W 12/037* (2021.01)
*H04W 92/02* (2009.01)

(52) U.S. Cl.
CPC ........... *H04L 12/66* (2013.01); *H04W 12/037* (2021.01); *H04W 12/08* (2013.01); *H04W 92/02* (2013.01)

(58) Field of Classification Search
None
See application file for complete search history.

(56) References Cited

U.S. PATENT DOCUMENTS

| | | | |
|---|---|---|---|
| 10,805,856 B2 | 10/2020 | Fiorani et al. | |
| 11,026,004 B2 | 6/2021 | Das | |
| 11,196,157 B1* | 12/2021 | Bonney | H01Q 3/005 |
| 2017/0048278 A1* | 2/2017 | Tomasso | H04L 63/10 |
| 2020/0059821 A1 | 2/2020 | Wirth et al. | |
| 2020/0236727 A1 | 7/2020 | Salkintzis | |
| 2020/0296799 A1 | 9/2020 | Barabell et al. | |

(Continued)

FOREIGN PATENT DOCUMENTS

| | | |
|---|---|---|
| EP | 3482602 A1 | 5/2019 |
| WO | 2020067346 A1 | 4/2020 |
| WO | 2020098954 A1 | 5/2020 |

(Continued)

OTHER PUBLICATIONS

IEEE 802.11 and 3GPP 5G System Interworking, Binita Gupta, Intel Corporation, Tutorial at IEEE 802 Plenary, Oct. 2020.

*Primary Examiner* — Saad Khawar
(74) *Attorney, Agent, or Firm* — Suiter Swantz pc llo (57) ABSTRACT

A system may include a tactical military network including tactical nodes and a tactical gateway node configured as a trusted network access node (TNAN) to a mobile core network. The system may further include a military trusted interworking function (M-TIF) device of the mobile core network. The M-TIF device may support an interworking function between the tactical military network and the mobile core network. The M-TIF device may be communicatively coupled to the tactical gateway node. The tactical gateway node may be collocated with the M-TIF device. Services of the mobile core network may be accessible to the tactical nodes via the tactical gateway node and the M-TIF device.

15 Claims, 6 Drawing Sheets

(56) References Cited

U.S. PATENT DOCUMENTS

2020/0359244 A1  11/2020  Yao et al.
2021/0160562 A1  5/2021   Wong et al.

FOREIGN PATENT DOCUMENTS

| WO | 2020160176 A1 | 8/2020 | |
|---|---|---|---|
| WO | 2020200410 A1 | 10/2020 | |
| WO | 2020260921 A3 | 2/2021 | |
| WO | 2021034906 A1 | 2/2021 | |
| WO | WO-2021165934 A1 * | 8/2021 | ......... H04L 63/0892 |

* cited by examiner

HETEROGENOUS NETWORK OF TACTICAL NETWORK AND MOBILE CORE NETWORK VIA MILITARY TRUSTED INTERWORKING FUNCTION (M-TIF) DEVICE

BACKGROUND

Cellular infrastructure is designed to support seamless multi-Radio Access Terminal (RAT) networks. Cellular User Equipment (UE) can roam seamlessly between $5^{th}$ generation (5G)/$4^{th}$ generation (4G)/$3^{rd}$ generation (3G)/$2^{nd}$ generation (2G) networks, and the UE can avail themselves of different services provided by the network infrastructure.

SUMMARY

In one aspect, embodiments of the inventive concepts disclosed herein are directed to a system. The system may include a tactical military network including tactical nodes and a tactical gateway node configured as a trusted network access node (TNAN) to a mobile core network. The system may further include a military trusted interworking function (M-TIF) device of the mobile core network. The M-TIF device may support an interworking function between the tactical military network and the mobile core network. The M-TIF device may be communicatively coupled to the tactical gateway node. The tactical gateway node may be collocated with the M-TIF device. Services of the mobile core network may be accessible to the tactical nodes via the tactical gateway node and the M-TIF device.

In a further aspect, embodiments of the inventive concepts disclosed herein are directed to a method. The method may include: providing a tactical gateway node of a tactical military network, the tactical gateway node configured as a trusted access node (TNAN) to a mobile core network, the tactical military network comprising tactical nodes and the tactical gateway node; and providing a military trusted interworking function (M-TIF) device of the mobile core network, the M-TIF device supporting an interworking function between the tactical military network and the mobile core network, the M-TIF device communicatively coupled to the tactical gateway node, wherein the tactical gateway node is collocated with the M-TIF device, wherein services of the mobile core network are accessible to the tactical nodes via the tactical gateway node and the M-TIF device.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a method and a system including a tactical gateway node of a tactical military network and a military trusted interworking function (M-TIF) device of a mobile core network, wherein services of the mobile core network may be accessible to tactical nodes of the tactical military network via the tactical gateway node and the M-TIF device.

Incorporating a tactical radio(s) of a tactical node(s) into a cellular network can ensure that the cellular network can seamlessly offer services to the tactical radio(s) just like the cellular network does to a cellular UE. Some embodiments include incorporating tactical radios into 5G networks.

Typically, defining new procedures in cellular standards to incorporate tactical radios into a cellular network could be a long, drawn-out process. In addition, defining new procedures in cellular standards to incorporate tactical radios into a cellular network also has the possibility of exposing many internal details of the tactical radios and waveforms that Department of Defense wants to avoid.

Some embodiments may leverage already defined standards and/or standards currently being defined to support other use cases to incorporate tactical radio(s) into a 5G network with minimal changes to the tactical radio and/or the waveform used, as well as not exposing any internal details of a tactical military network to the 5G network.

Some embodiments may use trusted non-3rd Generation Partnership Project (non-3GPP) network access interfaces to integrate tactical radios running any IP-based tactical waveforms, such as tactical targeting network technology (TTNT) and Tactical Scalable MANET (TSM), to be registered as a supported 5G UE so that data can be seamlessly distributed between 5G and tactical networks.

Some embodiments may include use of Trusted non-3GPP Access networks that can be connected to the 5G Core Network. For example, the M-TIF device may use a standard Trusted WLAN Interworking Function (TWIF), a standard Trusted Non-3GPP Gateway Function (TNGF), and/or a standard Non-3GPP Interworking Function (N3IWF) to interface to the 5G Core network. The M-TIF device may perform a proxy function between an interworking function (e.g., TWIF) and the TNAN in the M-TIF device that may perform necessary translations to keep the interworking function (e.g., TWIF) and 5G Core compatible. Some embodiments enable tactical radios, which may be considered analogous or equivalent to a Non-5G Capable over wireless local area network (WLAN) (N5CW) devices, to access the 5G core network via a military-TIF (M-TIF) device. For example, each node of the tactical network may be considered analogous to a N5CW device even though each node may not support and/or host a WLAN interface. For example, each of the tactical nodes may appear as a N5CW device to the 5G Core network. However, typically, an N5CW device has an associated Universal Subscriber Identity Module (USIM) and has to perform certain functions as an N5CW device, but such USIM and performance of such certain functions would be considered as a significant change to tactical waveform standards. Therefore, to make each tactical node appear to be a N5CW device, the M-TIF device may be configured to run a proxy function that performs such certain functions to the satisfaction of the 5G Core network requirements.

Currently, 5G standards are geared towards IP devices that do not support 5G air interface using the IP devices' Wi-Fi (IEEE 802.11 family of standards) connection to access a Trusted WLAN Access Network so that IP devices can access 5G network services.

Referring now to FIGS. 1-5, an exemplary embodiment of a system 100 according to the inventive concepts disclosed herein is depicted. The system 100 may be implemented as any suitable system, such as a heterogenous network of networks. The system 100 may include at least one tactical military network 102, at least one mobile core network (e.g., at least one 5th generation mobile core network (5G Core network) 110), at least one United States protected network (e.g., at least one secret internet protocol router network (SIPRNET) 114 and/or at least one non-classified internet protocol router network (NIPRNET) 116), at least one radio access node (RAN) (e.g., at least one 5G RAN 118), and/or at least one mobile network (e.g., at least one 5G network 120, which may include 5G UE 122), some or all of which may be communicatively coupled at any given time.

Figure 1:
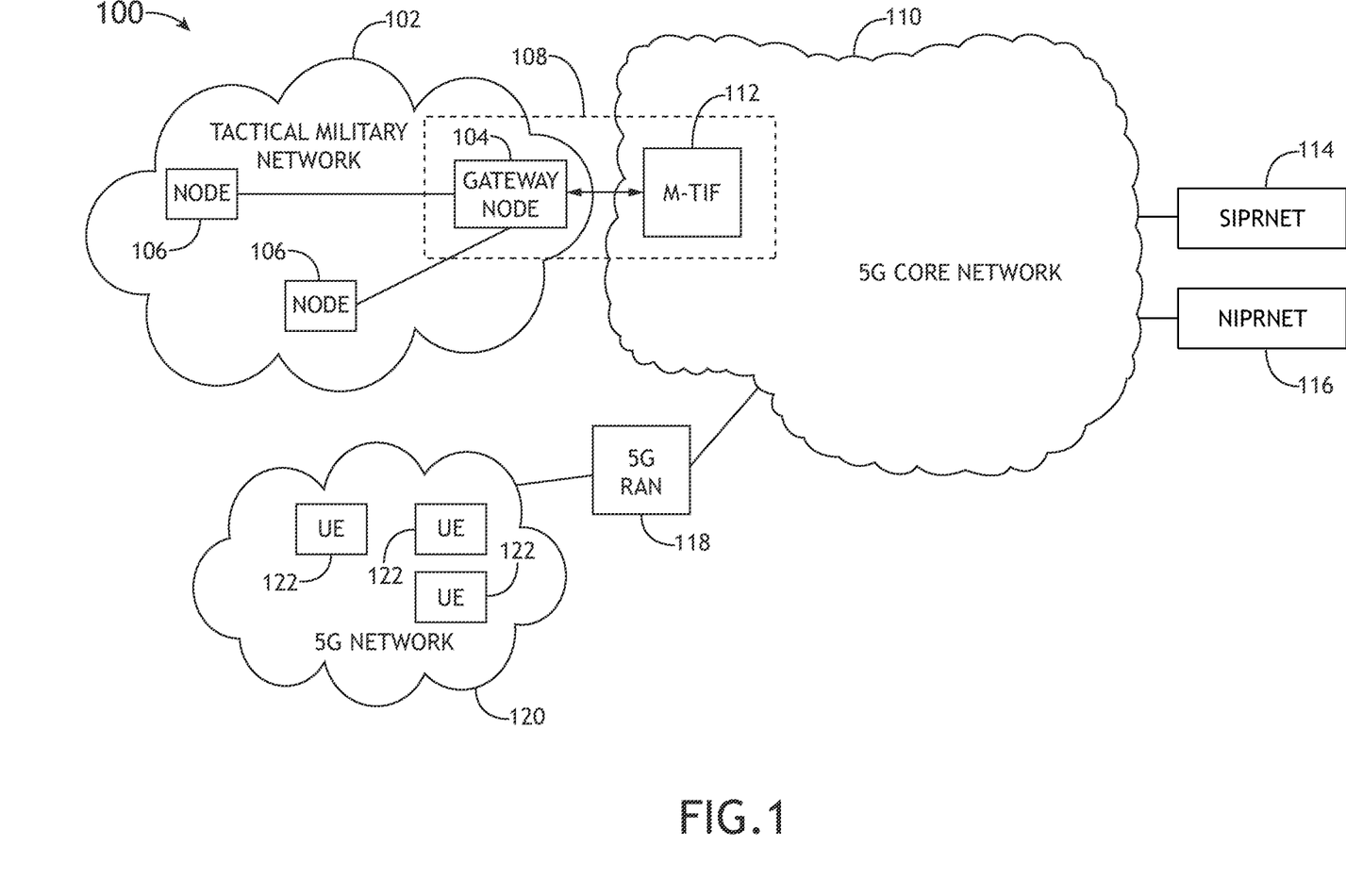
FIG. 1 is a view of an exemplary embodiment of a system according to the inventive concepts disclosed herein.
Figure 2:
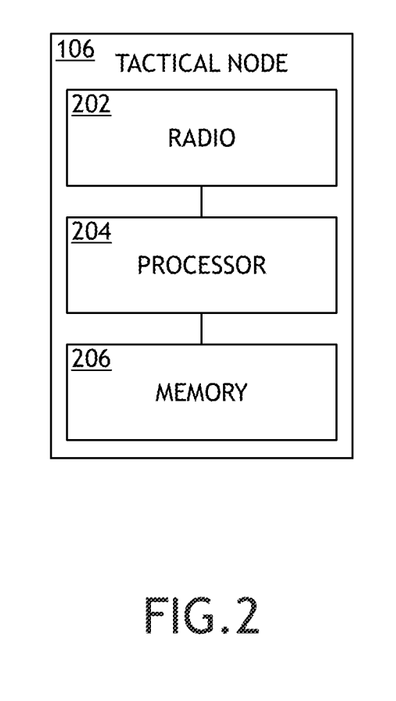
FIG. 2 is a view of an exemplary tactical node of the system of FIG. 1 of an exemplary embodiment according to the inventive concepts disclosed herein.
Figure 3:
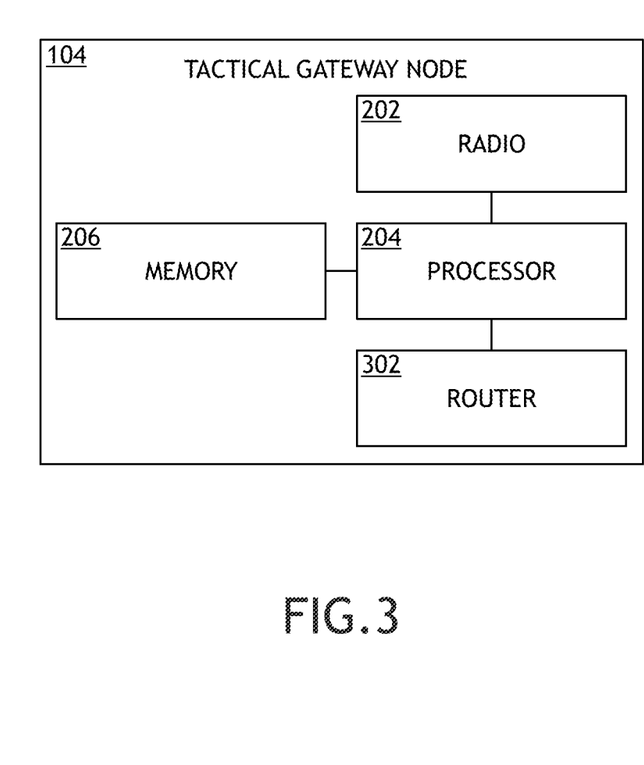
FIG. 3 is a view of an exemplary tactical gateway node of the system of FIG. 1 of an exemplary embodiment according to the inventive concepts disclosed herein.

The system 100 may include any suitable number and/or type of tactical military networks 102, and each tactical military network 102 may be configured to communicate via any suitable waveform(s) (e.g., a tactical targeting network technology (TTNT) waveform and/or a TSM waveform). For example, one or more of the tactical military networks 102 may be mobile ad-hoc networks (MANETs). As shown in FIGS. 1-3, each tactical military network 102 may include at least one tactical node 106 and at least one tactical gateway node 104, some or all of which may be communicatively coupled at any given time.

Each tactical node 106 may be any suitable network node, such as a terminal (e.g., a vehicle (e.g., an aircraft, a watercraft, a submersible craft, an automobile, a spacecraft, a satellite, and/or a train) or a manpack). As shown in FIG. 2, each tactical node 106 may include at least one radio 202 (e.g., at least one software-defined radio (SDR)), at least one processor 204, and/or at least one memory 206, some or all of which may be communicatively coupled at any given time. For example, each radio 202 may be configured to communicate via any suitable waveform(s) (e.g., the TTNT waveform and/or the TSM waveform). For example, one or more of the tactical nodes 106 may be considered analogous or equivalent to a non-5G capable over WLAN (N5CW) nodes. For example, each tactical node 106 may use generic routing encapsulation (GRE) for control traffic and user plane traffic to a military trusted interworking function (M-TIF) device 112. For example, the at least one processor 204 may be configured to perform (e.g., collectively perform if more than one processor) any or all of the operations disclosed throughout. The at least one processor 204 may be configured to run various software applications or computer code stored (e.g., maintained) in a non-transitory computer-readable medium (e.g., memory 206) and configured to execute various instructions or operations.

As shown in FIG. 3, each tactical gateway node 104 may include at least one radio 202 (e.g., at least one SDR), at least one processor 204, at least one memory 206, and/or at least one router 302, some or all of which may be communicatively coupled at any given time. For example, each radio 202 may be configured to communicate via any suitable waveform(s) (e.g., the TTNT waveform and/or the TSM waveform). For example, the tactical gateway node 104 may be configured as a trusted network access node (TNAN) to the mobile core network (e.g., the 5G Core network 110); for example, the tactical gateway node 104 may be a TNAN. For example, the tactical gateway node 104 may be located at location 108, and the tactical gateway node 104 may be collocated with a military trusted interworking function (M-TIF) device 112 of the mobile core network (e.g., the 5G Core network 110). For example, services of the mobile core network may be accessible to the tactical nodes 106 via the tactical gateway node 104 and the M-TIF device 112. For example, the at least one processor 204 may be configured to perform (e.g., collectively perform if more than one processor) any or all of the operations disclosed throughout. The at least one processor 204 may be configured to run various software applications or computer code stored (e.g., maintained) in a non-transitory computer-readable medium (e.g., memory 206) and configured to execute various instructions or operations.

Figure 4:
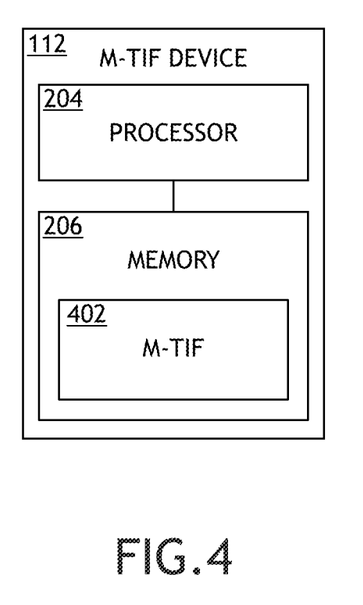
FIG. 4 is a view of an exemplary M-TIF device of the system of FIG. 1 of an exemplary embodiment according to the inventive concepts disclosed herein.
Figure 5:
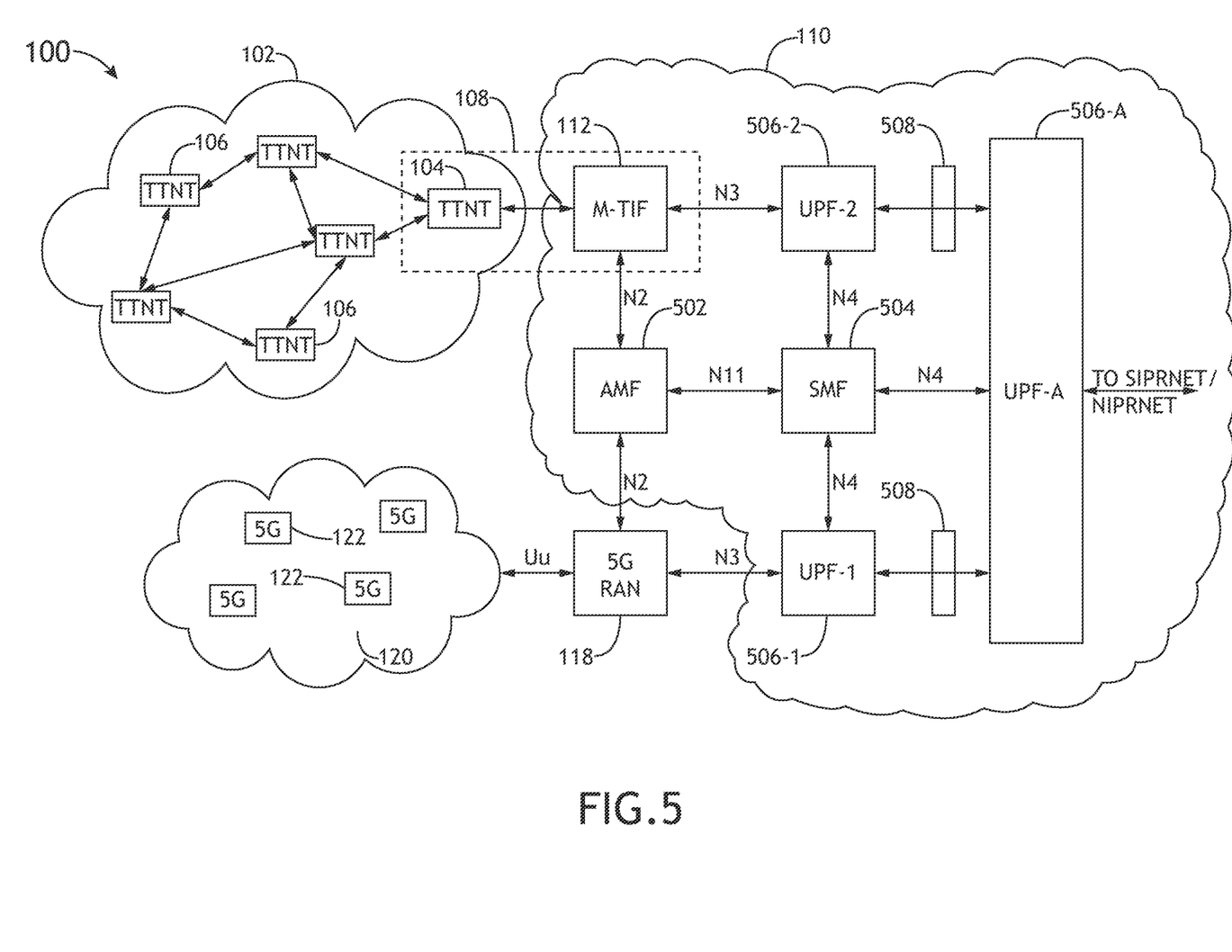
FIG. 5 is a further view of an exemplary embodiment of the system of FIG. 1 according to the inventive concepts disclosed herein.

As shown in FIGS. 1, 4, and 5, the at least one mobile core network (e.g., the 5G Core network 110) may be any suitable number and/or type of one mobile core network, such as the 5G Core network 110. As shown in FIGS. 1 and 5, the mobile core network (e.g., the 5G Core network 110) may include at least one military trusted interworking function (M-TIF) device 112, at least one Access & Mobility Management Function (AMF) device 502, at least one Session Management Function (SMF) device 504, at least one User Plane Function (UPF)-1 device 506-1, at least one UPF-2 device 506-3, at least one UPF-Anchor (UPF-A) device 506-A, and/or at least one cryptographic guard 508, some or all of which may be communicatively coupled at any given time.

For example, the M-TIF device 112 may support an interworking function (e.g., M-TIF 402) between the tactical military network 102 and the mobile core network (e.g., the 5G Core network 110). The M-TIF device 112 may be communicatively coupled to the tactical gateway node 104. The tactical gateway node 104 may be collocated with the M-TIF device 112 at the location 108. For example, 5G standards do not define how an access point or gateway node can be considered secure; some embodiments, may utilize access to the external world via a controlled and secure NIPRNET/SIPRNET connection, and, also, data to and from the tactical military 102 to the SIPRNET 114 and/or NIPRNET 116 may never go through any uncontrolled interfaces, which may be achieved collocating the tactical gateway node 104, the M-TIF device 112, and the mobile core network to the same platform. For example, services of the mobile core network (e.g., the 5G Core network 110) may be accessible to the tactical nodes 106 via the tactical gateway node 104 and the M-TIF device 112. As shown in FIG. 4, each M-TIF device 112 may include at least one processor 204, at least one memory 206, and/or at least one router, some or all of which may be communicatively coupled at any given time. For example, the at least one processor 204 may be configured to perform (e.g., collectively perform if more than one processor) any or all of the operations disclosed throughout. The at least one processor 204 may be configured to run various software applications (e.g., at least one interworking function (e.g., M-TIF 402)) or computer code stored (e.g., maintained) in a non-transitory computer-readable medium (e.g., memory 206) and configured to execute various instructions or operations. For example, the M-TIF device 112 may be configured to expose standard N2 and N3 interfaces to communicate with the 5G Core network 110. For example, the M-TIF device 112 may be configured to host Universal Subscriber Identity Module (USIM) configuration for users of the tactical military network 102 to perform proxy authentication, encryption, and session context management. For example, the M-TIF device 112 may be configured to perform military security classification and labelling for communications to the tactical gateway node 104. For example, no details regarding frequencies, transmission security (TRANSEC), and communications security (COMSEC) of the tactical military network 102 may be available to the mobile core network (e.g., the 5G Core network 110) and the M-TIF device 112.

In some embodiments, the system 100 may include one or multiple 5G networks 120 (e.g., each operating in the same or different bands) and/or one or multiple 5G Core networks 110 (e.g., each operating in the same or different bands) and multiple M-TIF devices 112 to interface to two or more tactical military networks 102 (e.g., each using a same or different tactical waveforms).

In some embodiments, where there are two or more tactical military networks 102 each using different waveforms, the M-TIF device 112 may be configured to use multiple interworking functions, each for a different waveform. For example, a first tactical military network 102 may use a first waveform, and a second tactical military network 102 may use a second waveform. The second tactical military network 102 may include second tactical nodes 106 and a second tactical gateway node 104 configured as a second TNAN to the mobile core network. The M-TIF device 112 may be communicatively coupled to the tactical gateway node 104 and the second tactical gateway node 104, and the tactical gateway node 104 and the second tactical gateway node 104 may be collocated with the M-TIF device 112. The M-TIF device 112 may support (a) a first interworking function between the tactical military network 102 and the mobile core network and (b) a second interworking function between the second tactical military network 102 and the mobile core network.

In some embodiments, where there are two or more tactical military networks 102 each using different waveforms, the mobile core network may include a second M-TIF device 112 using a second interworking function. For example, a first tactical military network 102 may use a first waveform, and a second tactical military network 102 may use a second waveform. The second tactical military network 102 may include second tactical nodes 106 and a second tactical gateway node 104 configured as a second TNAN to the mobile core network. For example, the second M-TIF device 112 may support a second interworking function between the second tactical military network 102 and the mobile core network. The second M-TIF device 112 may be communicatively coupled to the second tactical gateway node 104. The second tactical gateway node 104 may be collocated with the second M-TIF device 112.

As shown in FIG. 5, the mobile core network (e.g., the 5G Core network 110) may further include the at least one AMF device 502, the at least one SMF device 504, the at least one UPF-1 device 506-1, the at least one UPF-2 device 506-3, the at least one UPF-Anchor (UPF-A) device 506-A, and/or the at least one cryptographic guard 508. Each of the at least one AMF device 502, the at least one SMF device 504, the at least one UPF-1 device 506-1, the at least one UPF-2 device 506-3, the at least one UPF-A device 506-A, and/or the at least one cryptographic guard 508 may include: at least one processor (e.g., which may be implemented and function similar to processor 204), at least one memory (e.g., which may be implemented and function similar to memory 206), and/or at least one router, some or all of which may be communicatively coupled at any given time. For example, with respect to the at least one AMF device 502, the at least one SMF device 504, the at least one UPF-1 device 506-1, the at least one UPF-2 device 506-3, the at least one UPF-A device 506-A, and/or the at least one cryptographic guard 508, the at least one processor (e.g., 204) may be configured to perform (e.g., collectively perform if more than one processor) any or all of the operations disclosed throughout. The at least one processor (e.g., 204) may be configured to run various software applications or computer code stored (e.g., maintained) in a non-transitory computer-readable medium (e.g., 206) and configured to execute various instructions or operations.

As shown in FIG. 5, various components (e.g., the at least one M-TIF device 112, the at least one AMF device 502, the at least one SMF device 504, the at least one UPF-1 device 506-1, the at least one UPF-2 device 506-3, the at least one UPF-A device 506-A, and/or the at least one cryptographic guard 508) of the mobile core network (e.g., the 5G Core network 110) may be configured to use any suitable standard interfaces, such as N1, N2, N3, N4, N6, N11, and/or N12.

As shown in FIG. 5, cryptographic guards 508 may be deployed between the UPF-1 device 506-1 and the UPF-A device 506-A and/or between the UPF-2 device 506-2 and the UPF-A device 506-A such that only authorized data is exchangeable between the tactical military network 102 and the at least one United States protected network (e.g., at least one SIPRNET 114 and/or at least one NIPRNET 116).

FIG. 5 illustrates how one or more tactical nodes 106, which may be considered analogous or equivalent to N5CW devices, may interface to the 5G Core network 110 to form a seamless heterogenous network. In some embodiments, the UPF may be split into an anchor function (e.g., at UPF-A 506-A) that interfaces with the external world (e.g., SIPRNET 114 and/or NIPRNET 116). The traffic may be securely routed based on appropriate security classifications and labels to the 5G UPF function(s) and to a tactical waveform (e.g., TTNT or TSM) UPF function. The M-TIF device 112 may expose the standardized N3 and N2 interfaces to communicate with components of the 5G Core Network 110. The tactical military network 102, being a military grade security network, may not implement the Yt and Yw interfaces typically implemented by WLAN networks to limit changes to the tactical waveform (e.g., the TTNT waveform). In addition, the colocation of the tactical gateway node 104 performing the function of a TNAN and the M-TIF device 112 may permit WLAN specific functions to be replaced with alternative schemes, if required, without violating interoperability with the 5G Core network 110.

Figure 6:
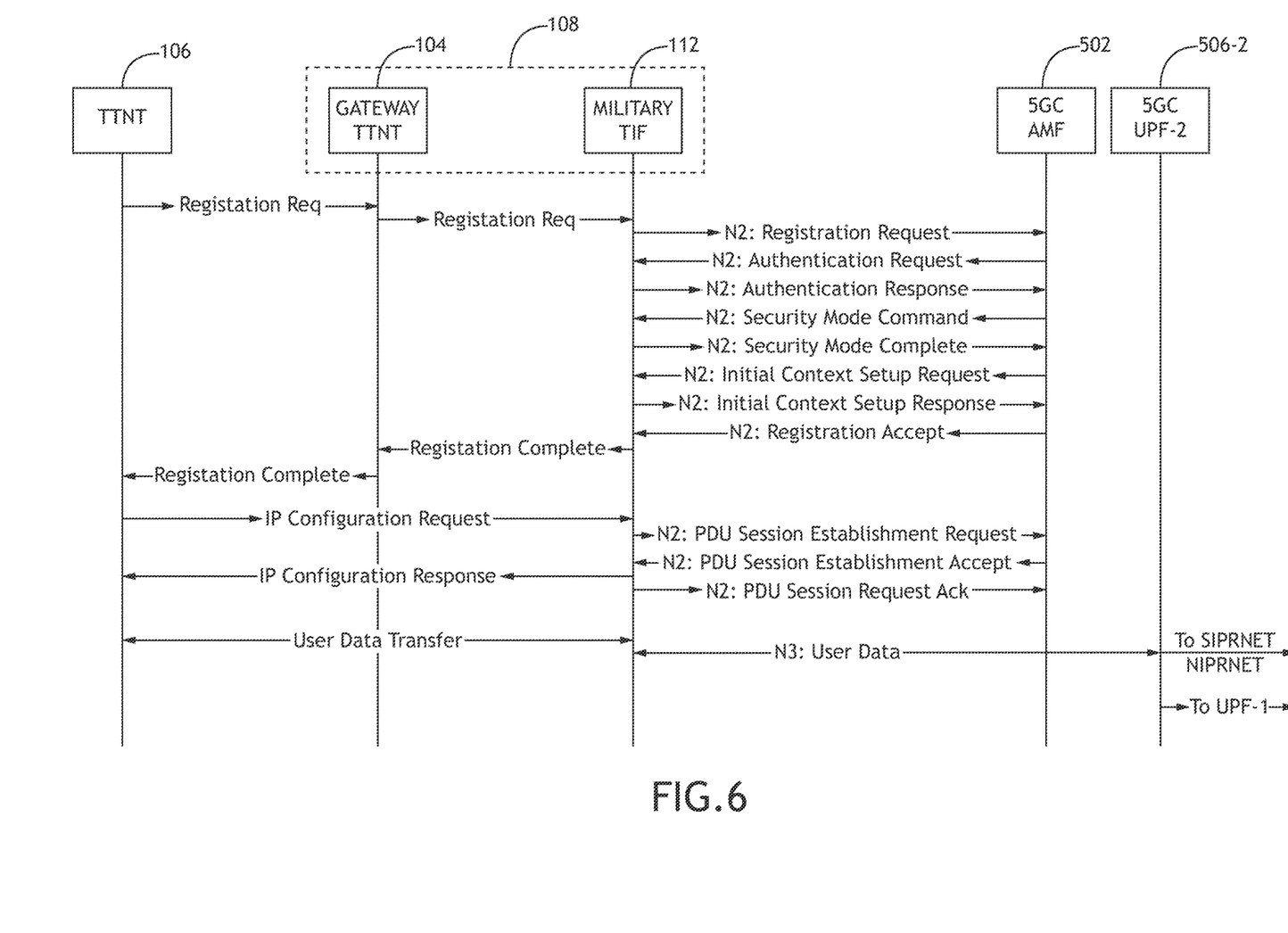
FIG. 6 is a view of an exemplary ladder diagram for the system of FIG. 1 of an exemplary embodiment according to the inventive concepts disclosed herein.

Referring now to FIG. 6, an exemplary ladder diagram showing how an exemplary tactical node 106 (e.g., a TTNT tactical node as shown) may establish a communication session with the 5G Core network 110 and may start a data transfer session of an exemplary embodiment of the system 100 according to the inventive concepts disclosed herein is depicted. For example, the TTNT tactical node 106 may establishes a communication session with the 5G Core network 110 while deployed in a contested area and may establishes a connection to the 5G Core UPF-2 device 506-2. From UPF-2 device 506-2, the traffic can be routed to the UPF-1 device 506-1 for sending it to a 5G node (e.g., 122) or to the UPF-A device 506-A for routing to SIPRNET 114 and/or NIPRNET 116.

Referring generally to FIGS. 1-6, the system 100 may be flexible enough to support multiple interworking functions (e.g., M-TIF 402) for different tactical military networks 102. For example, a UPF-3 device can be introduced that handles TSM tactical military nodes 102, and traffic can be seamlessly routed between SIPRNET 114, NIPRNET 116, Military 5G 120, TTNT tactical military network 102, and TSM tactical military network 102. Access to a commercial 5G network may be achieved through SIPRNET 114 and/or NIPRNET 116 to ensure appropriate protection is in place to counter cyber-denial threats. If the system 100 is appropriately configured, then a tactical node 102 can roam between multiple tactical 5G networks 120. Standard procedures for registering, de-registering, re-registering, session creation, session deletion, and session migration may be supported between the 5G Core network 110 and multiple 5G RANs 118. These 5G RANs 118 may be collocated or geographically separated.

Traditionally, for commercial networks, a TNAN and a TWIF device are geographically separated. In some embodiments, the tactical gateway node 104 functioning as a TNAN and the M-TIF device 112 may be collocated on a same platform that hosts a 5G RAN 118 and communicates with a collocated 5G Core network 110.

In the commercial domain, WLAN UE may use EAP-5G, IKEv2, and/or IPSEC to secure a control plane between the UE and TWIF and GRE/IPSEC and GRE/ESP to secure the user plane. In some embodiments, since the tactical military network 102 is a secure network and since the tactical gateway node 104 and the M-TIF device 112 may be collocated on a secure platform, the tactical nodes 106 nodes may use GRE encapsulation for control traffic and user plane traffic to the M-TIF device 112. The M-TIF device 112 may host all the USIM configuration required for the military tactical network users to perform proxy authentication, encryption, and session context management. Appropriate military security classification and labeling may be incorporated at the M-TIF device 112 to the tactical gateway node 104 so that appropriate tactical military network protection can be employed within the tactical military network 102.

In the military domain, appropriate cryptographic guards 508 may be deployed between UPF-2 and UPF-A and between UPF-1 and UPF-A so that only authorized data can be exchanged between the 5G Core network 110, the tactical military network 102, and SIPRNET 114 and/or NIPRNET 116.

Additionally, the N11 and N12 interfaces may optionally be extended to incorporate Department of Defense (DoD) defined security and/or authentication mechanisms.

Some embodiments permit DoD to deploy a seamless heterogenous network 100 of networks with inter-network routability. Entire tactical networks 102 or selective users from tactical networks 102 can be incorporated as analogous or equivalent to 5G NSCW devices that can register on demand with a tactical 5G Core network 110. Roaming across networks may be seamlessly supported. In addition, military security may not be sacrificed. Details regarding frequencies, TRANSEC, COMSEC, etc. of the tactical military network 102 may be unavailable to the 5G Core network 110 and the M-TIF device 112. Policies may dictate labeling of traffic to and from the M-TIF device 112 so that the tactical military networks 102 can appropriately route information adhering to tactical networking standards.

Figure 7:
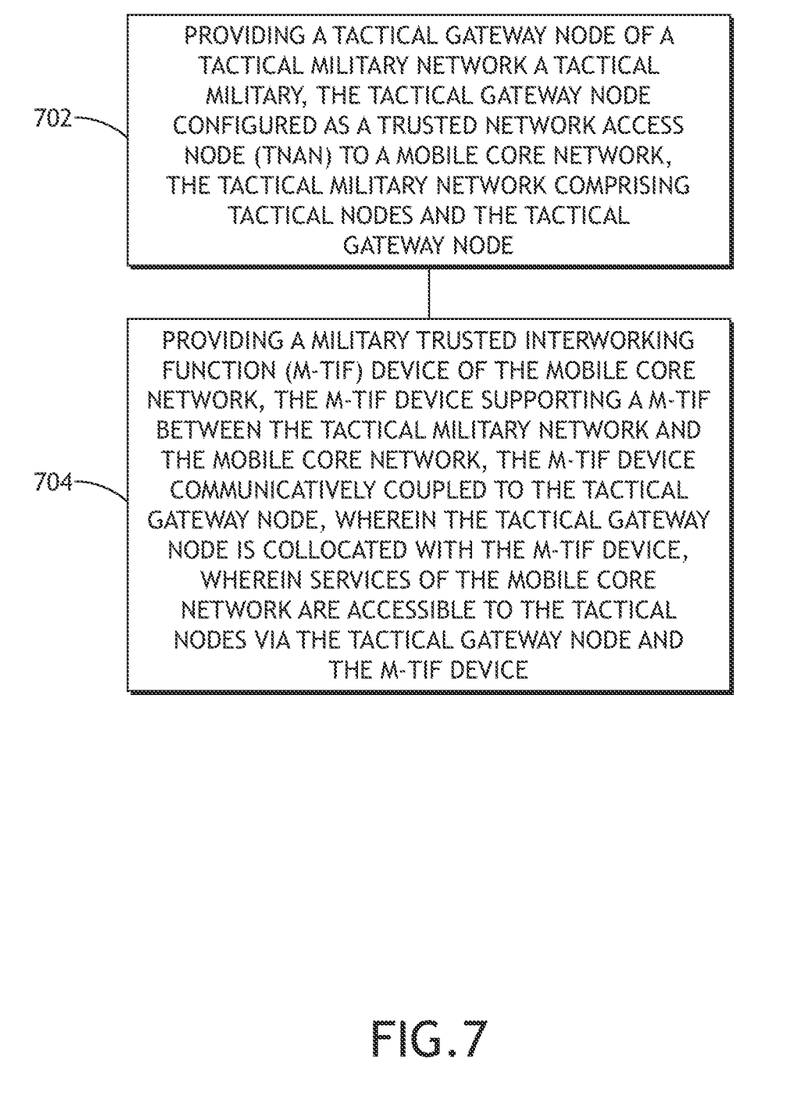
FIG. 7 is a diagram of an exemplary embodiment of a method according to the inventive concepts disclosed herein.

Referring now to FIG. 7, an exemplary embodiment of a method 700 according to the inventive concepts disclosed herein may include one or more of the following steps. Additionally, for example, some embodiments may include performing one more instances of the method 700 iteratively, concurrently, and/or sequentially. Additionally, for example, at least some of the steps of the method 700 may be performed in parallel and/or concurrently. Additionally, in some embodiments, at least some of the steps of the method 700 may be performed non-sequentially.

A step 702 may include providing a tactical gateway node of a tactical military network a tactical military, the tactical gateway node configured as a trusted network access node (TNAN) to a mobile core network, the tactical military network comprising tactical nodes and the tactical gateway node.

A step 704 may include providing a military trusted interworking function (M-TIF) device of the mobile core network, the M-TIF device supporting an interworking function between the tactical military network and the mobile core network, the M-TIF device communicatively coupled to the tactical gateway node, wherein the tactical gateway node is collocated with the M-TIF device, wherein services of the mobile core network are accessible to the tactical nodes via the tactical gateway node and the M-TIF device.

Further, the method 700 may include any of the operations disclosed throughout.

As will be appreciated from the above, embodiments of the inventive concepts disclosed herein may be directed to a method and a system including a tactical gateway node of a tactical military network and a military trusted interworking function (M-TIF) device of a mobile core network, wherein services of the mobile core network may be accessible to tactical nodes of the tactical military network via the tactical gateway node and the M-TIF device.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   a tactical military network comprising:
     tactical nodes; and
     a tactical gateway node configured as a trusted network access node (TNAN) to a mobile core network; and
   a military trusted interworking function (M-TIF) device of the mobile core network, the M-TIF device supporting an interworking function between the tactical military network and the mobile core network, the M-TIF device communicatively coupled to the tactical gateway node, wherein the tactical gateway node is collocated with the M-TIF device,
   wherein services of the mobile core network are accessible to the tactical nodes via the tactical gateway node and the M-TIF device;
   wherein the mobile core network is a 5th generation mobile core network (5G Core network), wherein at least some of the tactical nodes are considered analogous or equivalent to non-5G capable over wireless local area network (WLAN) (N5CW) nodes;
   wherein the tactical nodes use generic routing encapsulation (GRE) for control traffic and user plane traffic to the M-TIF device;
   wherein the M-TIF device is configured to host Universal Subscriber Identity (USIM) configuration for users of the tactical military network to perform proxy authentication, encryption, and session context management.

2. The system of claim 1, wherein the M-TIF device is configured to expose N2 and N3 interfaces to communicate with the 5G Core network.

3. The system of claim 1, wherein the M-TIF device is configured to perform military security classification and labelling for communications to the tactical gateway node.

4. The system of claim 1, wherein the 5G Core network further includes at least one of a user plane function (UPF)-1 device or a UPF-2 device, wherein the 5G Core network further includes a UPF-Anchor (UPF-A) device, wherein the 5G Core network is connected to at least one United States protected network, wherein cryptographic guards are deployed between the at least one of the UPF-1 device or the UPF-2 device and the UPF-A device such that only authorized data is exchangeable between the tactical military network and the at least one United States protected network.

5. The system of claim 4, wherein the at least one United States protected network is at least one of secret internet protocol router network (SIPRNET) or non-classified internet protocol router network (NIPRNET).

6. The system of claim 1, wherein no details regarding frequencies, transmission security (TRANSEC), and communications security (COMSEC) of the tactical military network are available to the mobile core network and the M-TIF device.

7. The system of claim 1, wherein the tactical military network is a mobile ad-hoc network (MANET).

8. The system of claim 7, wherein the tactical military network uses at least one of a tactical targeting network technology (TTNT) waveform or a Tactical Scalable Network (TSM) waveform.

9. The system of claim 1, wherein tactical military network uses a first waveform, wherein the system further comprises a second tactical military network using a second waveform, the second tactical military network comprising second tactical nodes and a second tactical gateway node configured as a second TNAN to the mobile core network.

10. The system of claim 9, wherein the M-TIF device is communicatively coupled to the tactical gateway node and the second tactical gateway node, wherein the tactical gateway node and the second tactical gateway node are collocated with the M-TIF device, wherein the M-TIF device supports (a) the interworking function between the tactical military network and the mobile core network and (b) a second interworking function between the second tactical military network and the mobile core network.

11. The system of claim 9, further comprising a second M-TIF device of the mobile core network, the second M-TIF device supporting a second interworking function between the second tactical military network and the mobile core network, the second M-TIF device communicatively coupled to the second tactical gateway node, wherein the second tactical gateway node is collocated with the second M-TIF device.

12. A method, comprising:
providing a tactical gateway node of a tactical military network a tactical military, the tactical gateway node configured as a trusted network access node (TNAN) to a mobile core network, the tactical military network comprising tactical nodes and the tactical gateway node; and
providing a military trusted interworking function (M-TIF) device of the mobile core network, the M-TIF device supporting an interworking function between the tactical military network and the mobile core network, the M-TIF device communicatively coupled to the tactical gateway node, wherein the tactical gateway node is collocated with the M-TIF device,
wherein services of the mobile core network are accessible to the tactical nodes via the tactical gateway node and the M-TIF device;
wherein the mobile core network is a 5th generation mobile core network (5G Core network), wherein at least some of the tactical nodes are considered analogous or equivalent to non-5G capable over wireless local area network (WLAN) (NSCW) nodes;
wherein the tactical nodes use generic routing encapsulation (GRE) for control traffic and user plane traffic to the M-TIF device;
wherein the M-TIF device is configured to host Universal Subscriber Identity Module (USIM) configuration for users of the tactical military network to perform proxy authentication, encryption, and session context management.

13. A system, comprising:
a tactical military network comprising:
tactical nodes; and
a tactical gateway node configured as a trusted network access node (TNAN) to a mobile core network; and
a military trusted interworking function (M-TIF) device of the mobile core network, the M-TIF device supporting an interworking function between the tactical military network and the mobile core network, the M-TIF device communicatively coupled to the tactical gateway node, wherein the tactical gateway node is collocated with the M-TIF device,
wherein services of the mobile core network are accessible to the tactical nodes via the tactical gateway node and the M-TIF device;
wherein tactical military network uses a first waveform, wherein the system further comprises a second tactical military network using a second waveform, the second tactical military network comprising second tactical nodes and a second tactical gateway node configured as a second TNAN to the mobile core network.

14. The system of claim 13, wherein the M-TIF device is communicatively coupled to the tactical gateway node and the second tactical gateway node, wherein the tactical gateway node and the second tactical gateway node are collocated with the M-TIF device, wherein the M-TIF device supports (a) the interworking function between the tactical military network and the mobile core network and (b) a second interworking function between the second tactical military network and the mobile core network.

15. The system of claim 13, further comprising a second M-TIF device of the mobile core network, the second M-TIF device supporting a second interworking function between the second tactical military network and the mobile core network, the second M-TIF device communicatively coupled to the second tactical gateway node, wherein the second tactical gateway node is collocated with the second M-TIF device.

* * * * *